US011124399B2

(12) United States Patent
Hohmann et al.

(10) Patent No.: US 11,124,399 B2
(45) Date of Patent: Sep. 21, 2021

(54) LIFTING AND TRANSPORTING DEVICE

(71) Applicants: Frank Hohmann, Warstein (DE); Jorg Hohmann, Meschede (DE)

(72) Inventors: Frank Hohmann, Warstein (DE); Jorg Hohmann, Meschede (DE)

(*) Notice: Subject to any disclaimer, the term of this patent is extended or adjusted under 35 U.S.C. 154(b) by 167 days.

(21) Appl. No.: 16/724,489

(22) Filed: Dec. 23, 2019

(65) Prior Publication Data
US 2020/0216296 A1 Jul. 9, 2020

(30) Foreign Application Priority Data

Jan. 4, 2019 (DE) ...................... 10 2019 200 042.8

(51) Int. Cl.
B66F 3/36 (2006.01)
B66F 3/24 (2006.01)

(52) U.S. Cl.
CPC ............... B66F 3/36 (2013.01); B66F 3/245 (2013.01); B66F 2700/055 (2013.01); F16B 2200/506 (2018.08)

(58) Field of Classification Search
CPC . B66C 23/18; B66C 23/48; B66C 9/04; B66F 19/00; B25B 29/00; B25B 29/02
See application file for complete search history.

(56) References Cited

U.S. PATENT DOCUMENTS 9,364,946 B2 * 6/2016 Hohmann ............... B66C 23/18

FOREIGN PATENT DOCUMENTS

DE 102012009255 11/2013
JP H08122479 5/1996
(Continued)

OTHER PUBLICATIONS

German Office Action dated Sep. 17, 2019; German Serial No. DE 10 2019 200 042.8; 4 pages.
(Continued)

Primary Examiner — Tyrone V Hall, Jr.
(74) Attorney, Agent, or Firm — John H. Thomas, P.C.

(57) ABSTRACT

In a lifting and transporting device for lifting a load (13) and for transporting the same transversely to the lifting direction (8), for use in the production of a screwed flange connection (35), in order to bring a tensioning tool (13) into a tensioning position in which it is in engagement with a screw bolt connection (18) to be pretensioned, or into a transport position in which it is out of engagement with a screw bolt connection and can be transported to the next screw bolt connection, wherein the flange (36a, 36b) extends horizontally, comprising a frame (2) for picking up and for lifting a load (13), a holding device (3) for holding the load, wherein the holding device is movable relative to the frame in the lifting direction (8), and comprising a hoisting device (4) for lifting and lowering the holding device (3) with the load (13) attached thereto, wherein the frame (2) is mounted on a first and a second support bearing (5, 6) and the first support bearing (5) is designed for abutment against the flange upper side (14), the frame (2) is designed to extend from the flange upper side (14) along the flange face (15) to below the flange underside (16), the second support bearing (6) is designed for abutment against the flange upper side (14) or against the flange face (15), the holding device (3) is equipped to hold the tensioning tool (13) below the flange underside (16) with the engaging means directed upwards, and the hoisting device (4) is equipped to lift the holding device (3) with the tensioning tool (13) attached thereto from a lowered transport position into a tensioning position.

15 Claims, 3 Drawing Sheets

(56) References Cited

FOREIGN PATENT DOCUMENTS

| JP | H09295230 | 11/1997 |
|---|---|---|
| KR | 20130026039 | 3/2013 |
| WO | 2016193297 | 12/2016 |

OTHER PUBLICATIONS

European Search Report dated Apr. 24, 2020; EP Serial No. 19219441.3-1017; 6 pages.

* cited by examiner

LIFTING AND TRANSPORTING DEVICE

CROSS-REFERENCE TO RELATED APPLICATIONS

This is a United States Patent Application claiming priority from German Patent Application No. 10 2019 200 042.8 having a filing date of Jan. 4, 2019, the contents of which are incorporated herein by reference.

This invention relates to a lifting and transporting device according to the preamble of claim 1.

In accordance with this application, pretensioning a screw bolt connection is understood to be both a pretensioning free from friction and torsion, in which exclusively a tensile force is applied to the screw bolt and the screw nut subsequently is turned, and a rotary pretensioning—e.g. by the torque method or the rotation angle method.

Correspondingly, in accordance with this application tensioning tools are understood to be both tensile-force-applying tensioning tools, e.g. bolt tensioning cylinders, and rotary tensioning tools, e.g. torque wrenches or nut runners, wherein the tensioning tools can be automatic or also manual tensioning tools.

Furthermore, tensioning position correspondingly is understood to be an attitude or position of a tensioning tool in which the same can pretension a screw bolt connection.

In accordance with this application, load space is understood to be the space occupied by the load to be lifted or to be transported.

A generic lifting and transporting device is known from DE 10 2012 009 255 A1. With such a device, screw bolt connections in flange connections can be pretensioned comfortably. The screw bolt therefor is put through the aligned through bores in the components to be connected with each other, until the bolt head abuts against the flange underside of the components to be connected. On the flange upper side a nut is manually screwed onto the bolt end provided with a thread, until it abuts against the flange upper side. A bolt tensioning cylinder is held in the lifting and transporting device above the flange upper side and is positioned above the screw bolt connection to be pretensioned and is then lowered onto the same. After pretensioning the screw bolt connection, the bolt tensioning cylinder is lifted again by means of the lifting and transporting device and shifted to the next screw bolt connection.

It is the object of the present invention to propose a lifting and transporting device by means of which screwed flange connections can be produced more easily.

According to the invention, this object is achieved in a device as mentioned above by the characterizing features of claim 1.

The invention is based on the finding that the production of many individual adjacent screw bolt connections within a screwed flange connection—for example of an annular flange for connecting cylindrical components—can be effected more quickly and easily when the screw bolts are put into the through-bores of the flanges to be connected with each other from above. Then, it is easier to manually screw the nuts onto the screw bolts, as the screw bolts safely rest on the flange upper side with their heads and need not be held from below during screwing-on of the nut, or screwing-on each time must be effected against the own weight of the screw bolt.

By the measures according to the invention, tools for pretensioning screw bolt connections can quickly and comfortably be brought into engagement with a screw bolt connection on the flange underside in order to pretension or release the same, and can subsequently be transported to the next screw bolt connection. With the proposed lifting and transporting device a tensioning tool on the flange underside not only can briefly be lifted, but can also easily be held in the lifted position. Due to the fact that in accordance with the invention the lifting and transporting device is mounted on the flanges to be connected with each other and extends along the flange upper side and the flange face towards the flange underside—hence is suspended on the flange, no further components on the one hand are necessary for support—neither any component walls adjoining the flanges—and the lifting and transporting device requires only a minimum space in front of the flanges to be connected with each other. Thus, the fitter also can mount or suspend the lifting and transporting device on the flanges from the working position, in which he introduces the screw bolts into the through-bores of the flanges from above. In addition, from this working position the fitter also can actuate the lifting and transporting device, i.e. lift the tensioning tool from the transport position into the tensioning position and hold it there during pretensioning, and upon completion of the tensioning operation again lower the tensioning tool into the transport position and shift it on to the next screw bolt connection. The tensioning tool is fixed in the holding device and held by the same on the flange underside with the engaging means directed upwards. Along with and during lifting of the tensioning tool into the tensioning position it is brought into engagement with the screw bolt connection to be pretensioned. Existing scaffolds, working platforms or landings need not be modified for the individual assembly steps.

Preferably, the lifting device includes a force amplification device in order to lift the holding device with the tensioning tool attached thereto from the transport position into the tensioning position. In this way, the use of muscular force of the fitter operating the lifting and transporting device is reduced. Without external help, the fitter thereby can also lift heavy tensioning tools (e.g. for screw bolts M 64) into the tensioning position as often as desired and hold them there for any length of time and thus pretension a large number of screw bolt connections without getting tired.

The force amplification device preferably includes at least one gas pressure cylinder. The muscular force to be used thereby is reduced to a minimum.

In another advantageous embodiment of the invention the force amplification device includes a block and tackle. This is an extremely inexpensive possibility for force amplification.

In a favorable development of the invention, the hoisting device includes a lever which is pivotally attached to the frame about a first pivot axis which extends perpendicularly to the lifting direction, with a first lever portion which extends from the first pivot axis on the load space side of the frame and to which the holding device is pivotally attached about a second pivot axis which extends parallel to the first pivot axis, and with a second lever portion which proceeding from the first pivot axis extends away from the load space and includes a handle for actuating the lever. With these measures, the hoisting device can be of structurally simple design and can also be actuated very easily. A fitter only has to pivot the lever by means of the handle in order to lift or lower the tensioning tool.

The lever preferably is operatively engaged with the force amplification device. In this way, the force amplification device also is activated upon actuation of the lever.

Advantageously, the lever extends perpendicularly or parallel to the transport direction. Thereby, an adaptation to the respective space conditions can be made. In addition, the geometry and hence the manufacture of the hoisting device thereby is further simplified.

In a favorable embodiment of the invention, the frame includes two identical frame parts which in transport direction are arranged before and behind the load space. With these measures, the load space is accessible from the front or from below so that for example a tensioning tool can be connected to a control device or supply device on its front side and/or underside, and the connecting lines between the two frame parts are guided out of the load space and into the same, respectively.

Preferably, each support bearing includes two sliding members or two rollers, which in transport direction are arranged in front of or behind the load space. The risk of tilting in transport direction thereby is reduced considerably. In addition, the individual sliding members or rollers can be dimensioned smaller.

In a preferred embodiment, the second support bearing is designed for abutment against the flange face and the support directions extend perpendicularly to each other. In a simple way, this embodiment provides for a guided horizontal displacement of the tensioning tool, as the flange face usually extends perpendicularly to the flange upper side and forms a guideway in horizontal direction for the second support bearing resting against the flange face.

The second support bearing preferably is arranged in the lower half of the flange face. The tilting stability of the lifting and transporting device perpendicularly to the transport direction thereby is increased, as the distance between the first support bearing on the flange upper side and the second support bearing on the flange face is designed as large as possible and thus a tilting moment as large as possible can be absorbed.

In another advantageous embodiment of the invention the first support bearing is designed for abutment against the flange upper side between the screw bolt connection and the flange edge. With this measure, the lifting and transporting device can easily be suspended on the flange upper side proceeding from the flange face. The tensioning tool then is attached to the holding device below the flange and can remain there until all screw bolt connections of the flange connection are pretensioned.

Preferably, the lifting and transporting device includes an arresting device by means of which the holding device can be arrested in the tensioning position. When lifting the holding device and the tensioning tool attached thereto by pure muscular force, the handling of the lifting and transporting device during the tensioning operation is facilitated considerably. In particular, this applies for torque wrenches or nut runners, as the same are not screwed onto the screw to be pretensioned like bolt tensioning cylinders. When force amplification devices are present, such an arresting device constitutes a safety device for the case that the force amplification device fails during the tensioning operation.

In a favorable embodiment of the invention the frame includes a third support bearing for dissipating horizontal forces, which act transversely to the transport direction or to the flange face, into the flange upper side and/or flange underside. With these measures, tilting or slipping of the lifting and transporting device from the flange upper side safely is prevented.

The third support bearing preferably is arranged in front of and behind the load space in transport direction and attached to the frame and configured to engage behind the screw bolt connections which are located adjacent to the screw bolt connection to be pretensioned. With these measures, the third support bearing can be realized in a constructionally simple and inexpensive way.

The invention will subsequently be explained in greater detail by way of example with reference to the drawings, in which.

Figure 1:
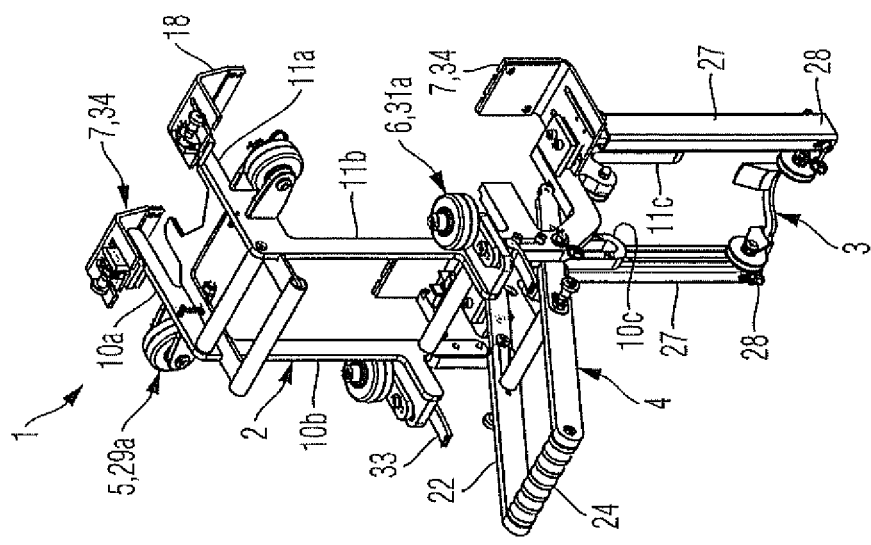
FIG. 1 shows a perspective view of a first embodiment of a lifting and transporting device according to the invention.

The embodiment of a lifting and transporting device 1 according to the invention as shown in the Figures includes a frame 2, a holding device 3, a hoisting device 4 as well as first, second and third support bearings 5, 6, 7. The lifting direction is designated with 8 and the transport direction with 9.

The frame 2 is formed of two frame parts 10, 11 which in transport direction 9 are arranged in front of and behind a load space 12, which is designed to accommodate a tensioning tool 13, and extend perpendicularly to the transport direction 9 from the flange upper side 14 along the flange face 15 to below the flange underside 16. The frame parts 10, 11 are rigidly connected with each other by cross bars 17 extending in the transport direction 9. In the illustrated exemplary embodiment, the clear distance between the portions 10c, 11c of the frame parts 10, 11 arranged below the flange underside 16 is designed to accommodate a bolt tensioning cylinder 13 (FIGS. 4 and 5), which for tensioning a screw bolt connection 18 is engageable with the same. To these frame portions 10c, 11c the holding device 3 for the bolt tensioning cylinder 13 is vertically movably attached.

The invention here is described with reference to the use together with a bolt tensioning cylinder 13. By simple constructional modifications of the holding device 13 a lifting and transporting device 1 according to the invention can, however, also be used for any other automatic or manual tensioning tool.

The bolt tensioning cylinder or each tensioning tool 13 is aligned in the holding device 3 such that the means 19, which for pretensioning are to be engaged with the screw bolt connection 18, are directed upwards, i.e. facing the screw bolt connection 18, so that by moving the holding device 3 upwards the engaging means 19 of the tensioning tool 13 can be brought into engagement with the screw bolt connection 18 to be pretensioned.

On the frame portions 10b, 11b extending along the flange face, a lever 20 is pivotally mounted as a hoisting device 4 about a first pivot axis 21 which extends in the transport direction 9. The lever 20 is of U-shaped design, wherein the legs 22 of the U extend perpendicularly to the transport direction 9 and each are attached to one of the two frame portions 10b, 11b by means of a first pivot bearing 23. The base of the U is formed by a handle 24 by means of which the lever 20 can be actuated.

Each leg 22 of the U includes a first lever portion 20a, which extends from the pivot bearing 23 towards the load space side, and a second lever portion 20b, which extends from the pivot bearing 23 towards the side facing away from the load space 12 and at whose free end the handle 24 is attached.

At the free ends of the first lever portions 20a the holding device 3 each is pivotally mounted by means of a second pivot bearing 25 whose (second) pivot axis 26 extends parallel to the first pivot axis 21.

In the illustrated exemplary embodiment, the hoisting device 4 furthermore includes two gas pressure cylinders 27 which are arranged in front of and behind the load space 12 in the transport direction 9 and one of which each is attached to one of the frame portions 10c, 11c below the flange underside 16. The gas pressure cylinders 26 extend vertically and extend downwards beyond the lower end of said frame portions 10c, 11c. With their free, shiftable end 28 they are connected with the holding device 3 so that by vertically shifting this end 28 of the two gas pressure cylinders 27, the holding device 3 with the tensioning tool 13 attached thereto is traversable vertically upwards or downwards.

The gas pressure cylinders 27 are operatively connected with the lever 20 so that by correspondingly actuating the lever 20, the gas pressure cylinders 27 are activated and lift the holding device 3 with the tensioning tool 13 attached thereto into the tensioning position or lower the same into the transport position.

For example, the gas pressure cylinders 27 can be pretensioned in the lowered transport position, wherein the pretensioning force is directed upwards, i.e. in the lifting direction 8, and are designed such that they can lift the tensioning tool 13 including the holding device 3 from the transport position into the tensioning position. Lowering from the tensioning position into the transport position and hence pretensioning of the gas pressure cylinders 27 then can be effected e.g. manually by pressing down by means of the lever 20.

It is conceivable to lock the gas pressure cylinders 27 in the transport position and unlock the same for lifting, e.g. by means of the lever 20.

On the two frame portions 10a, 11a, which extend along the flange upper side 14, a first track roller 29 each is rotatably mounted about an axis of rotation 30 which extends parallel to the flange upper side 14 or horizontally and perpendicularly to the transport direction 9. The two first track rollers 29 jointly form a first track roller pair 29a which in turn forms the first support bearing 5 for the frame 2.

On the two frame portions 10b, 11b, which extend along the flange face 15, a second track roller 31 each is rotatably mounted about an axis of rotation 32 which extends parallel to the flange face 15 or vertically and perpendicularly to the transport direction 9. These two track rollers 31 jointly form a second track roller pair 31a which in turn forms the second support bearing 6.

On the frame portions 10b, 11b extending in front of the flange face 15 two adjusting devices 33 for the second track rollers 31 are mounted, to which these track rollers 31 are attached and by means of which these track rollers 31 are shiftable for horizontally abutting against the flange face 15.

To the frame portions 10a, 11a, 10c, 11c which extend along the flange upper side 14 and along the flange underside 16 a sheet 34 bent at right angles each is attached, which is designed to engage behind a screw bolt connection located adjacent to the screw bolt connection 18 to be pretensioned. These angled sheets 34 jointly form the third support bearing 7 which introduces possible forces acting horizontally at right angles to the transport direction 9 via the adjacent screw bolt connections into the flanges and thus excludes slipping of the lifting and transporting device 1 from the flanges.

Figure 2:
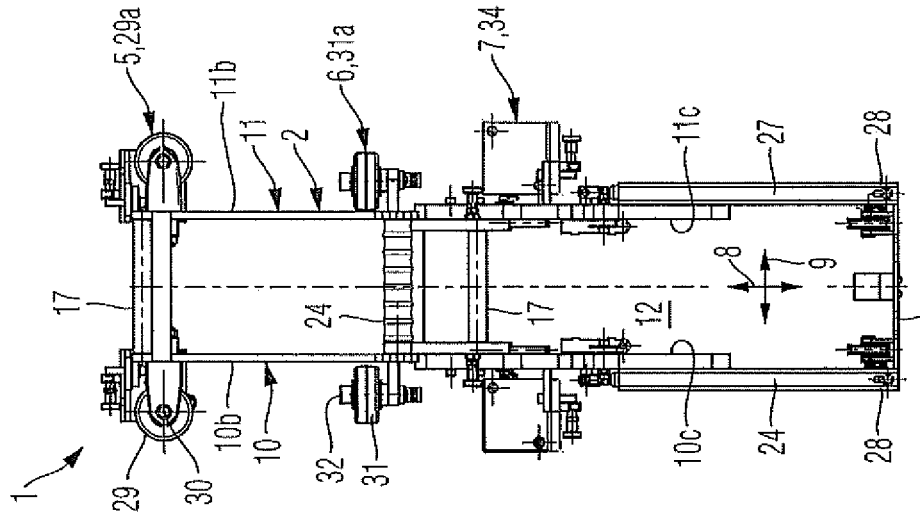
FIG. 2 shows a front view of the lifting and transporting device of FIG. 1.
Figure 3:
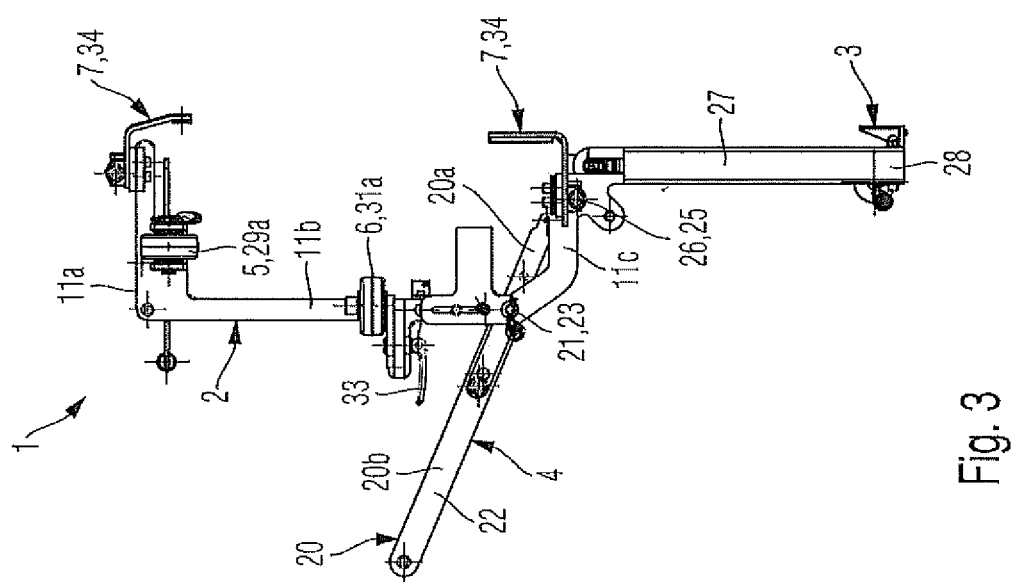
FIG. 3 shows a side view of the lifting and transporting device of FIG. 1.
Figure 4:
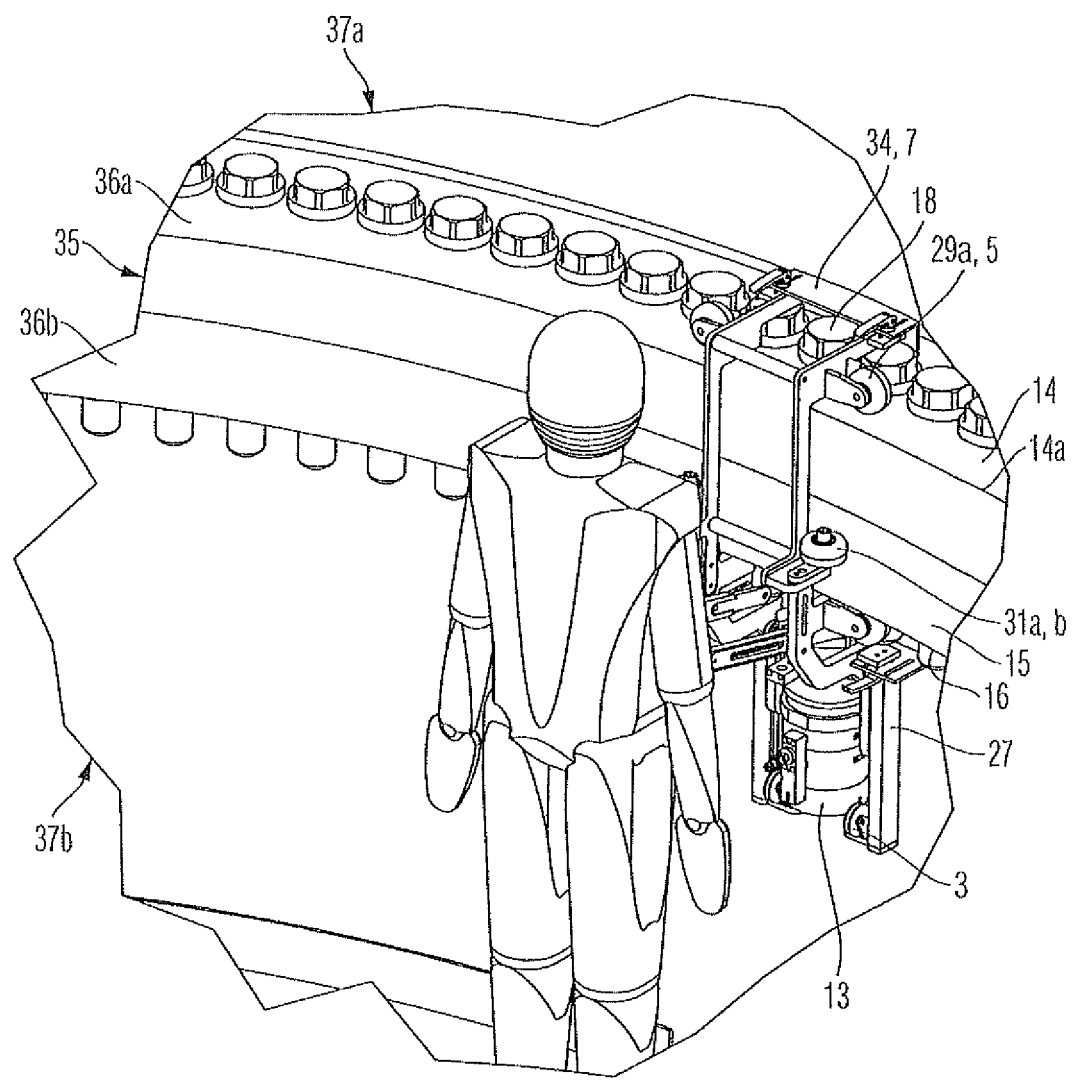
FIG. 4 shows a perspective view of the lifting and transporting device of FIG. 1, used when producing a screwed flange connection by means of a bolt tensioning cylinder.
Figure 5:
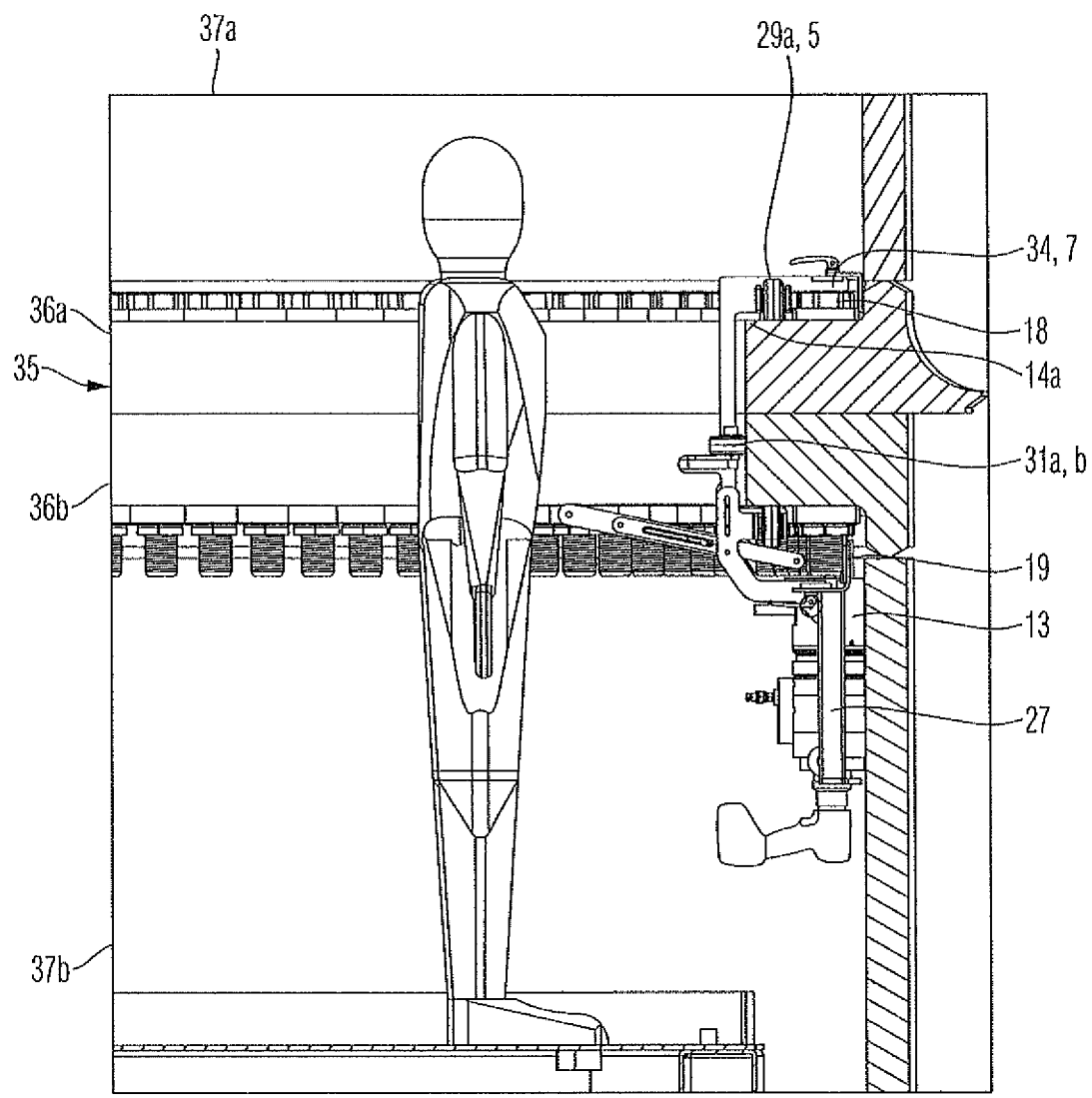
FIG. 5 shows a side view of the perspective view shown in FIG. 4, wherein the bolt tensioning cylinder is provided with a handle.

In FIGS. 4 and 5, the lifting and transporting device 1 of FIGS. 1 to 3 is shown in use during the production of a screwed flange connection 35. In the illustrated application example the flanges 36a, 36b of two cylindrical components 37a, 37b, which are to abut each other, are to be screwed to each other. The first track roller pair 29a abuts against the flange upper side 14 between the screw bolt connections and the flange edge 14a, and the second track roller pair 31a abuts against the lower half of the flange face 15. On the flange upper side 14 and on the flange underside 16, the angled sheets 34 of the third support bearing 7 engage behind the screw bolt connections which are located beside the screw bolt connection 18 to be pretensioned. Below the flange underside 16 a bolt tensioning cylinder 13 is attached as a tensioning tool in the holding device 3 with the engaging means 19 directed upwards. By means of the lever 20 the holding device 3 with the tensioning tool 13 attached thereto can now be lifted into the tensioning position—i.e. be lifted to such an extent that the engaging means 19 comes into engagement or can be engaged with the screw bolt connection 18 to be pretensioned—and can also be held in the tensioning position during the tensioning operation. Upon actuation of the lever 20 the two gas pressure cylinders 27 also are activated, which support the lifting operation by their pretensioning force.

After completion of the tensioning operation, the tensioning tool 13 is released from the screw bolt connection 18. When actuating the lever 20 in the direction of lowering the tensioning tool 13, the gas pressure cylinders 27 are again pretensioned and the holding device 3 and the tensioning tool 13 attached to the same are lowered to such an extent that the upper edge of the tensioning tool 13 lies below the bolt end of the screw bolt connection 18. The lifting and transporting device 1 and with the same the tensioning tool 13 now can freely be shifted or rolled to the next screw bolt connection 18 to be pretensioned. There, the tensioning tool 13 can be brought into engagement with the screw bolt connection 18 by again actuating the lever 20 correspondingly.

The invention claimed is:

1. A lifting and transporting device for lifting a load and for transporting the same transversely to the lifting direction, for use in the production of a screwed flange connection in order to bring a tensioning tool into a tensioning position in which it is in engagement with a screw bolt connection to be pretensioned, or into a transport position in which it is out of engagement with a screw bolt connection and can be transported to the next screw bolt connection, wherein the flange extends horizontally, comprising
    a frame which for picking up and lifting a load extends around a load space of specified size,
    a holding device for holding the load, wherein the holding device is movable in a lifting direction relative to the frame, and comprising
    a hoisting device which is attached to the frame beside the load space, includes a portion extending on the load space side of said frame, to which the holding device is attached, and which is equipped for lifting and lowering the holding device with a load attached thereto,
    wherein the frame is mounted on a first and a second support bearing whose support directions each extend perpendicularly to the transport direction and which have a distance to each other perpendicularly to the transport direction, wherein the first support bearing is designed for abutment against the flange upper side, and wherein the support bearings include sliding members or rollers which can be shifted or rolled off in transport direction, wherein the frame (2) is designed to extend from the flange upper side (14) along the flange face (15) to below the flange underside (16), the second support bearing (6) is designed for abutment against the flange upper side (14) or against the flange face (15), the holding device (3) is equipped to hold the tensioning tool (13) below the flange underside (16) with the engaging means (19) directed upwards, and the hoisting device (4) is equipped to lift the holding device (3) with the tensioning tool (13) attached thereto from a lowered transport position into a tensioning position.

2. The lifting and transporting device according to claim 1, wherein the hoisting device (4) includes a force amplification device (27) in order to lift the holding device (3) with the tensioning tool (13) attached thereto from the transport position into the tensioning position.

3. The lifting and transporting device according to claim 2, wherein the force amplification device includes at least one gas pressure cylinder (27).

4. The lifting and transporting device according to claim 2, wherein the force amplification device includes a block and tackle.

5. The lifting and transporting device according to claim 1 wherein the hoisting device (4) includes a lever (20) which is pivotally attached to the frame (2) about a first pivot axis (21) which extends perpendicularly to the lifting direction (8), with a first lever portion (20a) which extends from the first pivot axis (21) on the load space side of the frame (2) and to which the holding device (3) is pivotally attached about a second pivot axis (26) which extends parallel to the first pivot axis (21), and with a second lever portion (20b) which proceeding from the first pivot axis (21) extends away from the load space (12) and includes a handle (24) for actuating the lever (20).

6. The lifting and transporting device according to claim 5, wherein the lever (20) is operatively engaged with the force amplification device (27).

7. The lifting and transporting device according to claim 5 wherein the lever (20) extends perpendicularly or parallel to the transport direction (9).

8. The lifting and transporting device according to claim 1 wherein the frame (2) includes two identical frame parts (10, 11) which are arranged in front of and behind the load space (12) in the transport direction (9).

9. The lifting and transporting device according to claim 1 wherein each support bearing (5, 6) includes two sliding members or two rollers (29, 31) which are arranged in front of and behind the load space (12) in the transport direction (9).

10. The lifting and transporting device according to claim 1 wherein the second support bearing (6) is designed for abutment against the flange face (15) and the support directions extend perpendicularly to each other.

11. The lifting and transporting device according to claim 10, wherein the second support bearing (6) is arranged in the lower half of the flange face (15).

12. The lifting and transporting device according to claim 1 wherein the first support bearing (5) is designed for abutment against the flange upper side (14) between the screw bolt connection (18) and the flange edge (14a).

13. The lifting and transporting device according to claim 1 further comprising an arresting device by means of which the holding device (3) can be arrested in the tensioning position.

14. The lifting and transporting device according to claim 1 wherein the frame (2) includes a third support bearing (7) for dissipating horizontal forces acting transversely to the flange face (15) into the flange upper side (14) and/or flange underside (16).

15. The lifting and transporting device according to claim 14, wherein the third support bearing (7) is arranged in front of and behind the load space (12) in the transport direction (9) and is attached to the frame (2) and configured to engage behind the adjacent screw bolt connections.

* * * * *